United States Patent

Copeland, III

[15] 3,699,548

[45] Oct. 17, 1972

[54] SINGLE WALL DOMAIN LATERAL DISPLACEMENT

[72] Inventor: John Alexander Copeland, III, Gillette, N.J.

[73] Assignee: Bell Telephone Laboratories, Incorporated, Murray Hill, N.J.

[22] Filed: July 6, 1971

[21] Appl. No.: 159,983

[52] U.S. Cl. ........................340/174 TF, 340/174 SR

[51] Int. Cl............................G11c 11/14, G11c 9/00

[58] Field of Search................................340/174 TF

[56] References Cited

OTHER PUBLICATIONS

IBM Tech. Diclosure Bulletin, " Read/Write Control" by Walker, Vol. 13, No. 11, 4/71 p. 3474, 3475.

IBM Tech. Disclosure Bulletin, " And/Or Combinatorial Bubble Domain Logic Device" by Almasi et al., Vol. 13, No. 6, 11/70, p. 1,410.

IBM Tech. Disclosure Bulletin, " Combination And/Or Logic Device" by Genovese, Vol. 13, No. 6, 11/70, p. 1,522, 1,523.

IBM Tech Disclosure Bulletin, " Bubble Domain Logic Circuits" by Lin, Vol. 13, No. 10, 3/71 p. 3,019, 3,010.

*Primary Examiner*—Stanley M. Urynowicz, Jr.
*Attorney*—R. J. Guenther and Kenneth B. Hamlin

[57] ABSTRACT

The multistage rail arrangement known as the lateral displacement coding arrangement defines a pair of positions for a single wall domain in each stage of a closed loop channel. Turns in the path of a channel of this type are described which eliminate geometric distortions and consequently exhibit relatively high operating margins.

15 Claims, 4 Drawing Figures

SINGLE WALL DOMAIN LATERAL DISPLACEMENT

FIELD OF THE INVENTION

This invention relates to data processing arrangements and more particularly to such arrangements in which information is represented as a pattern of single wall domains.

BACKGROUND OF THE INVENTION

The term "single wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movements of a domain.

One suitable propagation arrangement for moving a domain comprises a pair of serpentine conductors aligned along an axis and offset from one another therealong to provide domain displacement along the axis when pulsed alternatively with bipolar pulses. The lateral displacement coding arrangement includes serpentine conductors which also define a multistage domain propagation arrangement. A rail along the above-mentioned axis, in the context of a lateral displacement coding arrangement, defines first and second stable positions for a domain to first and second sides thereof in each of the stages. A domain is moved along the rail in response to the pulses in the conductors without changing sides. In practice, the rail forms a closed loop and a domain is stored initially in each stage to a reference (zero) side of the rail. A binary one is stored by displacing a domain laterally from the reference side to the paired position in an input stage of the channel leaving an absent domain in the reference side. A logical consequence of the arrangement is that a domain to the "one" side of the rail is accompanied by an absent domain in the reference side as it moves about the channel. Of course the opposite is true also.

Since the arrangement requires a pair of stable positions for a domain in each stage and a like number of stages is required to each side of the rail, problems are encountered when a turn in the channel is necessary. It may be understood, to be specific, that the domain channel outside the rail must be longer than the channel inside the rail just from geometric considerations. The straight line sections of the two channels of course are of equal length. But the turns require different geometries for the two rails. Yet equal numbers of stages are required for the two channels in spite of the unequal path lengths imposed by the geometry. Moreover any distortion in the geometry of the drive field decreases the operating margins of the arrangement.

BRIEF DESCRIPTION OF THE INVENTION

In accordance with this invention, unequal numbers of stages are provided in the channels to first and second sides of a rail, but information moves synchronously in the channels as if the paths were of equal length. The apparent paradox is resolved by including, in one embodiment, an additional stage to the outside of the rail at each turn and designing the additional stage such that a domain permanently occupies a position in the additional stage unless dislodged by another domain moving along the channel. A domain which occupies the position in the additional stage functions as a relay domain advancing information one stage when interacted with an information bearing domain entering the additional stage. The path length of the channel outside the rail equals the path length of the channel inside the rail plus the length of the additional stage at each of four turns necessary to form a closed loop geometry. Since the relay domain at each turn advances information one stage in each instance, information still moves through like numbers of stages in the two channels synchronously, undisturbed by the additional four relay stages.

DETAILED DESCRIPTION

Figure 1:
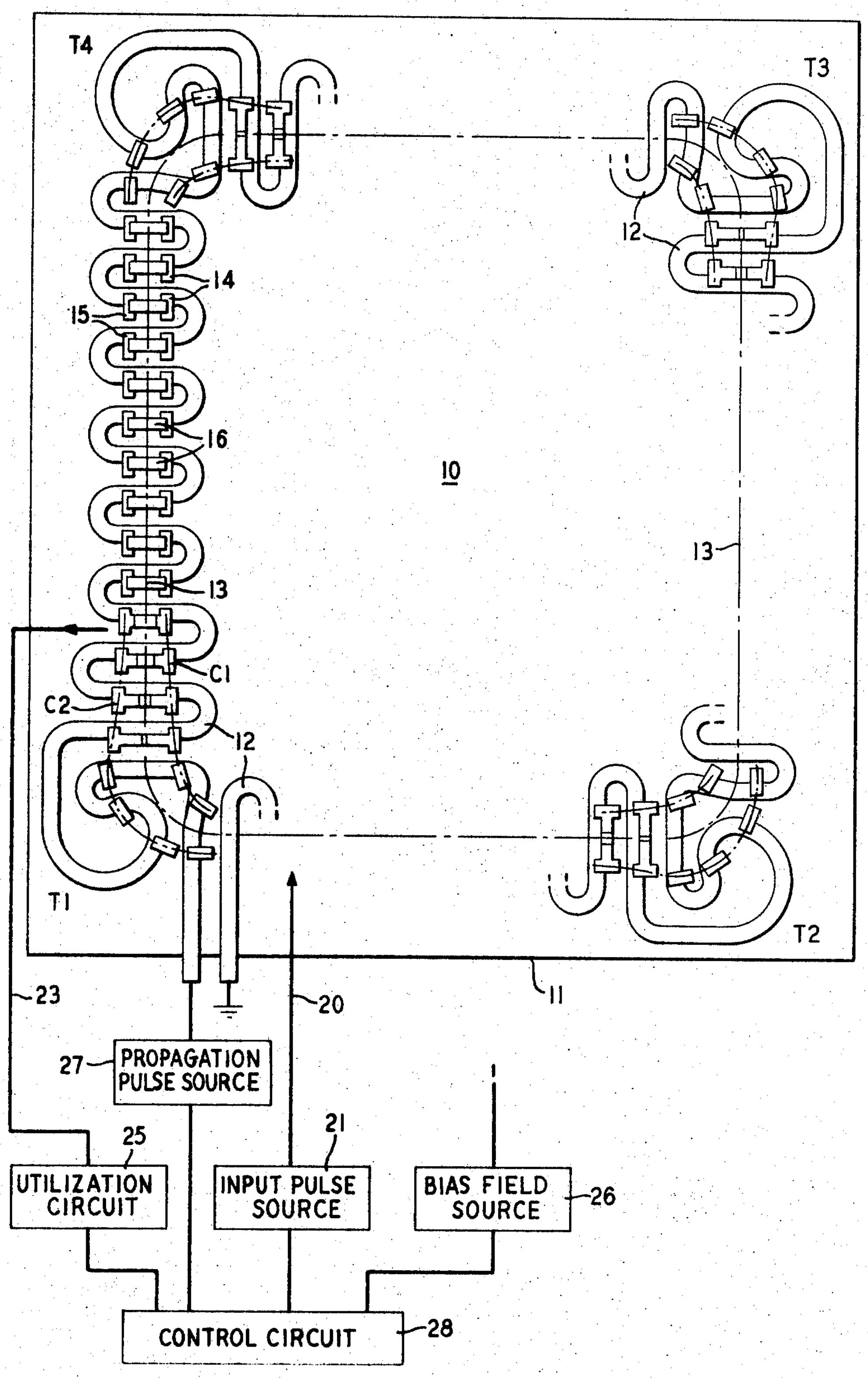
FIG. 1 is a schematic representation of an arrangement in accordance with this invention.

FIG. 1 shows a single wall domain arrangement 10 in accordance with this invention. The arrangement comprises a layer 11 of material in which single wall domains can be moved and a drive arrangement for so moving domains.

The drive arrangement comprises a single serpentine-shaped electrical conductor 12 each loop of which defines a stage of a multistage channel for domains shown as a broken line 13 in FIG. 1. The axis of the channel is defined by spaced apart magnetically soft overlay elements 14 and 15 in each of the stages. A third magnetically soft element 16 is oriented horizontally with respect to elements 14 and 15 of each stage and is offset with respect to the loop of conductor 12 which defines the stage. Although the elements 14, 15, and 16 are referenced separately, they typically comprise portions of a single magnetically soft overlay in each stage. The function of elements 14 or elements 15 is to define two laterally displaced channels for domains. The function of element 16 is to offset a domain from the position to which the domain is moved by the pulse in conductor 12 in each instance. In this manner, unidirectional movement of domains in the channel is ensured with a single propagation conductor as is disclosed in U.S. Pat. No. 3,564,518 of R. F. Fischer, issued Feb. 16, 1971.

Elements 14 and 15 of consecutive stages define channels C1 and C2 respectively. A domain is offset to a position between consecutive elements in each instance when a drive pulse terminates and thus has a portion of its wall underlying the middle of conductor 12 when the latter is pulsed. Such a position is consistent with forward movement of the domain in response to the next consecutive drive pulse of opposite polarity in conductor 12 in each instance. The elements 14 and 15 can be seen to form closed loop channels where a domain in each stage can occupy a position between elements 14 or between the associated elements 15. The analogy to a single rail defining two stable positions for a domain as disclosed in my above-mentioned copending application is emphasized.

In any case, the arrangement functions as a complementary system in which a domain normally occupies a position in each stage corresponding a pair of elements 14 — a reference or zero position. A domain represents a binary one when moved laterally across the rail to occupy a position between a pair of elements 15. Once the lateral position of a domain in a stage is determined at an input position, the drive pulses advance the domain so as to retain its lateral position and thus the information it represents.

Each position in channel C1 is assumed to be occupied by a domain when the arrangement has no information therein. Consequently, the displacement of domains laterally to channel C2 leaves vacancies (binary zeros) in channel C1 for synchronous movement with domains so displaced. It is important to bear in mind, accordingly, that stored information (in channel C2) and its complement (in channel C1) are moved synchronously. Consequently, when information is erased (viz: a domain moved back to the associated position in channel C1) there exists a vacancy for it there.

If we now direct our attention to one of the four turns T1, T2, T3, or T4 in FIG. 1, we can see that channel C1 is shorter than channel C2 presenting the difficulty of providing a like number of stages in the two channels with unequal path lengths where geometric variations in the drive arrangement detract from operating margins.

The difficulty is resolved in accordance with the illustrative embodiment of this invention by including an additional stage in each turn in channel C2 and by including a domain in each of the additional stages to act as a relay domain. A relay domain functions to take the place of a domain representing information and to advance the information, in so doing, by one stage. The function is performed only in response to domain interaction as is now well understood in the art and the drive configuration at the position of the relay domain is designed so that the relay domain does not otherwise move. Of course, the absence of a domain representative of a binary zero does not result in the movement of a relay domain and an absent domain is advanced one stage accordingly as will be explained more fully hereinafter.

Figure 2:
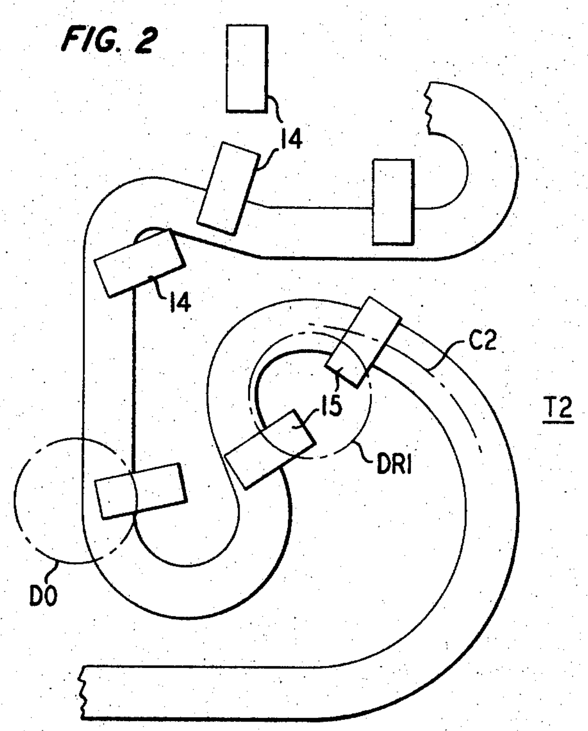
FIGS. 2, 3, and 4 are schematic representations of portions of the arrangement of FIG. 1 showing the disposition of information therein during operation.

FIG. 2 shows an enlarged view of turn T2 of FIG. 1 including a relay domain DR1. It is helpful to bear in mind that particularly in a closed loop arrangement of FIG. 1, every stage has a domain in it to one side or the other of the rail (viz: in channel C1 or C2). Consider the direction of information movement in the channels to be counter clockwise in FIGS. 1 and 2. A binary one, in this context, may be assumed to occur in a stage just prior to turn T2 as represented by domain DO in FIG. 2. Notice that the front of the domain DO is shown beyond the center line of conductor 12 in the direction of movement. The relay domain lies between the mid points of two loops of conductor 12.

Figure 3:
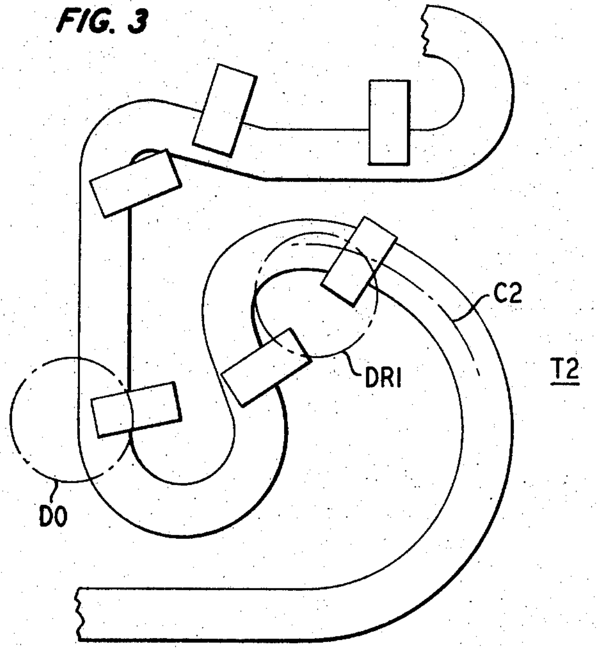

At this juncture, domain DO begins to fall behind its complement as the bipolar pulses in conductor 12 advance information in the channels. But domain DO now interacts with domain DR1 offsetting the latter to a position underlying the mid point of conductor 12 in the direction of movement as shown in FIG. 3. Domain DR1, consequently, is in a position where the next subsequent field generated by a pulse in conductor 12 is operative to advance the domain and thus is seen to move from a neutral to an operative position when an information domain moves into a turn. For reference, broken lines C2 are shown along the mid line of conductor 12 in FIGS. 2 and 3.

Figure 4:
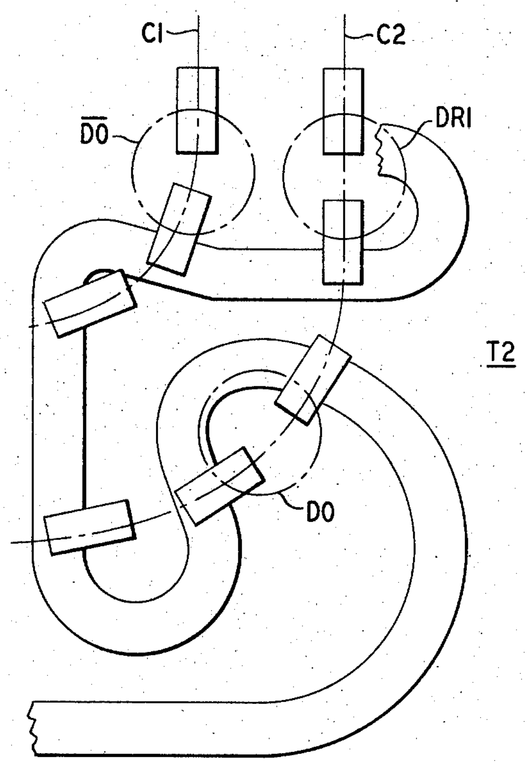

The complement of domain DO, represented by the broken circle designated $\overline{\text{DO}}$ in FIG. 4 is shown advanced to its normal position beyond turn T2 in response to the pulses on conductor 12. FIG. 4 also shows that domain DR1 occupies the associated position in channel C2 having been substituted for domain DO. Domain DO may be seen to now occupy the relay position in FIG. 4, the information represented thereby being advanced one stage for association with absent domain $\overline{\text{DO}}$.

Of course, had an absent domain moved along channel C2 into turn T1 (viz: a domain in channel C1), domain DR1 would not have been offset from its neutral position. In this case, a domain would occupy the position of absent domain $\overline{\text{DO}}$, in the previous example and an absent domain would occupy the position of domain DR1 in FIG. 4.

A closed loop channel has four ninety degree turns of the type shown in FIG. 4. Each turn includes a relay position always occupied by a relay domain which is in a position to be only negligibly influenced by the fields produced by pulses in conductor 12.

Information is recorded in arrangements of the type shown in FIG. 1 by displacing domains from the reference to the storage side of the rail. This is accomplished in a manner described in my aformentioned copending application and only indicated herein by arrow 20 originating at an input pulse source represented by block 21 of FIG. 1. Similarly, a detection arrangement is represented by arrow 23 connected to a utilization circuit represented by block 25 in FIG. 1. A bias field source for maintaining domain size constant is represented by block 26 of FIG. 1. Conductor 12 is connected between a propagation pulse source represented by block 27 in FIG. 1 and ground. Sources 21, 26, and 27 and circuit 25 are connected to a control circuit 28 for synchronization and activation. The various sources and circuits herein may be any such elements capable of operating in accordance with this invention.

In closed loop geometries of the type described, ninety degree turns are employed. But non-closed geometries of the lateral displacement organization may employ other than 90° turns. For each 90°one relay position is used. Consequently, a 180° turn uses two relay positions and domains. Such a turn may be visualized by abutting to the left of FIG. 4, as viewed, a mirror image of the geometry shown in that FIG.

What has been described is considered merely illustrative of the principles of this invention. Therefore, various modifications thereof can be devised by those skilled in the art within the spirit and scope of this invention.

What is claimed is:

1. A single wall domain arrangement comprising a layer of material in which single wall domains can be moved, means for defining in said layer a domain propagation channel having a plurality of stages and a first turn, and means for defining a pair of first and second stable positions for a domain in each of said stages, said arrangement being characterized in that said turn includes a relay position for which there is no paired position.

2. An arrangement in accordance with claim 1 wherein said means for defining a domain propagation channel comprises a serpentine-shaped electrical conductor arrangement for advancing domain patterns when pulsed, said conductor arrangement at said turn having a geometry such that a domain in said relay position is not advanced by said pulses.

3. An arrangement in accordance with claim 2 wherein said conductor arrangement comprises a single electrical conductor and also includes a pattern of magnetically soft elements for defining stable domain positions in pairs, said elements being of a geometry and disposed with respect to said conductor to offset domains in a direction of domain movement from the positions to which domains are moved in response to said pulses.

4. An arrangement in accordance with claim 3 wherein said elements at said turn are disposed to define said relay position such that a domain in that position is not displaced by pulses in said conductor.

5. An arrangement in accordance with claim 4 wherein said elements at said turn are of a geometry and are disposed such that a domain moving into said relay position offsets a domain in said relay position such that the domain initially in the relay position is displaced by pulses in said conductor.

6. An arrangement in accordance with claim 5 wherein said first and second positions in consecutive ones of said stages form first and second closed loop domain propagation channels each including first second, third and fourth turns.

7. An arrangement in accordance with claim 6 also including means for moving a domain from one of said first and second channels to the other and means for detecting the presence or absence of a domain in one of said first and second channels.

8. An arrangement in accordance with claim 6 including a single wall domain in said relay position and in one of said first and second positions in each of said stages.

9. An arrangement in accordance with claim 7 also including means for providing a bias field for maintaining constant the diameter of domains in said layer.

10. An arrangement in accordance with claim 3 also including means for providing bipolar pulses in said single conductor.

11. An arrangement comprising a layer of material in which single wall domains can be moved, and means including a multiloop serpentine electrical conductor for defining in said layer a multistage propagation channel for moving ones of said domains coupled to ones of said loops, said means defining first and second laterally displaced positions in pairs for a domain in each of said stages and a turn, means for defining at said turn a stable position for a domain which position has no paired position, said last mentioned means being of a geometry and disposed with respect to said conductor such that a domain occupying said unpaired position is decoupled from said conductor in the absence of a domain moving into said turn.

12. A single wall domain arrangement comprising a layer of material in which single wall domains can be moved, a first electrical conductor coupled to said layer, means for defining in said layer first, second, and third positions for a domain with respect to said conductor, said first and third positions being stable positions for a domain, said second position being astable for a domain such that a domain positioned therein is offset to said first position in the absence of a pulse in said conductor, said first position being such that a first domain positioned therein remains there in the presence of said pulse, means for selectively offsetting said first domain from said first to said second position for displacement to said third position in the presence of said pulse, said last-mentioned means comprising means for selectively moving a second domain to said second position in a manner to interact with said first domain.

13. An arrangement in accordance with claim 12 wherein said first stable position is defined by a plurality of magnetically soft elements.

14. An arrangement in accordance with claim 12 wherein said conductor is arranged for moving single wall domains along a propagation channel including said first and second positions.

15. A single wall domain arrangement comprising a layer of material in which single wall domains can be moved, means for defining a first stable position for a first domain, means for selectively moving a second domain to a second position in a manner to interact with and thus offset said first domain to an astable position, and means for displacing a domain in said astable position wherein said first stable position is defined by a plurality of magnetically soft elements and said means for selectively moving comprises a multiloop serpentine electrical conductor defining a plurality of stages, said first stable position being in a position neutral with respect to a first of said stages, and said means for displacing comprising the next consecutive loop of said conductor.

* * * * *